US012624586B2

(12) United States Patent
Parkin et al.

(10) Patent No.: US 12,624,586 B2
(45) Date of Patent: May 12, 2026

(54) MAGNETIC DOOR OVERSLAM AND PAINT PROCESS RETENTION TOOL

(71) Applicant: GM GLOBAL TECHNOLOGY OPERATIONS LLC, Detroit, MI (US)

(72) Inventors: Jeffrey R. Parkin, Williamston, MI (US); Jason B. Hunt, Charlotte, NC (US); Patrice M. Page, Lansing, MI (US); Douglas Dinwiddie, Troy, MI (US); Kenneth Schmidt, Wixom, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/792,779

(22) Filed: Aug. 2, 2024

(65) Prior Publication Data

US 2026/0035977 A1 Feb. 5, 2026

(51) Int. Cl.
*E05F 5/02* (2006.01)

(52) U.S. Cl.
CPC ........... *E05F 5/025* (2013.01); *E05Y 2201/11* (2013.01); *E05Y 2201/46* (2013.01); *E05Y 2600/528* (2013.01); *E05Y 2900/531* (2013.01)

(58) Field of Classification Search
CPC .. E05F 5/025; E05Y 2201/11; E05Y 2201/46; E05Y 2600/528; E05Y 2900/531; E05C 17/56; E05C 17/047; E05C 17/54; E05C 19/16; E05C 21/005
See application file for complete search history.

(56) References Cited

U.S. PATENT DOCUMENTS

| | | | | |
|---|---|---|---|---|
| 5,692,264 | A * | 12/1997 | van der Steur | B05B 13/0292 16/374 |
| 6,006,635 | A * | 12/1999 | Stojkovic | E05B 79/04 81/484 |
| 6,092,271 | A * | 7/2000 | Stojkovic | E05B 17/06 269/904 |
| 6,656,278 | B2 * | 12/2003 | Baisch | E05B 17/0012 118/503 |
| 8,047,581 | B2 * | 11/2011 | Corre | E05B 17/0012 292/87 |

(Continued)

FOREIGN PATENT DOCUMENTS

| | | | | |
|---|---|---|---|---|
| CN | 205183013 | U | * | 4/2016 |
| CN | 219745393 | U | * | 9/2023 |

(Continued)

OTHER PUBLICATIONS

German Office Action from counterpart DE1020241275332, dated Jul. 14, 2025.

*Primary Examiner* — William L Miller

(57) ABSTRACT

A door retention device including: a base defining a hook configured to cooperate with a door or a door frame of a vehicle; and a magnet mounted to the base, the magnet configured to cooperate with the door or the door frame to which the door retention device is not in cooperation with by way of the hook. The door retention device is configured to hook onto the door or the door frame of the vehicle to position the door retention device between the door and the door frame, in a partially closed door position the magnet is configured to connect to the door frame or the door to hold the door relative to the door frame and prevent the door from completely closing.

18 Claims, 6 Drawing Sheets

(56) References Cited

U.S. PATENT DOCUMENTS

| | | | | |
|---|---|---|---|---|
| 8,678,453 | B2 * | 3/2014 | Caliguri | E05C 17/025 292/288 |
| 8,955,891 | B2 * | 2/2015 | Millsap | E05C 17/025 292/342 |
| 10,343,737 | B1 * | 7/2019 | Pascoe | B62D 65/06 |
| 10,458,163 | B1 * | 10/2019 | Trump | B05B 13/0285 |
| 11,168,499 | B2 * | 11/2021 | Pavlow | E05C 17/54 |
| 11,313,161 | B2 * | 4/2022 | Krstic | E05C 21/005 |
| 11,319,008 | B2 * | 5/2022 | Pascoe | B62D 65/026 |
| 11,414,906 | B1 * | 8/2022 | Tallent | E05D 11/1007 |
| 12,377,523 | B2 * | 8/2025 | Leon | B25B 11/02 |
| 2009/0127761 | A1 * | 5/2009 | Perche | E05C 17/047 269/329 |
| 2009/0267355 | A1 * | 10/2009 | Perche | E05B 17/0012 292/76 |
| 2011/0173792 | A1 * | 7/2011 | Polizzi | E05C 19/16 29/402.11 |
| 2013/0219658 | A1 * | 8/2013 | Krajewski | E05F 5/022 16/82 |
| 2014/0225385 | A1 * | 8/2014 | Millsap | E05C 17/025 292/288 |
| 2018/0008998 | A1 * | 1/2018 | Natsume | F26B 3/04 |
| 2018/0128025 | A1 * | 5/2018 | Estrada | E05C 17/56 |
| 2019/0136593 | A1 * | 5/2019 | McCallister | D06F 39/14 |
| 2019/0226250 | A1 * | 7/2019 | Pavlow | E05C 17/54 |
| 2019/0338572 | A1 * | 11/2019 | Cheever | E05C 17/54 |
| 2020/0040635 | A1 * | 2/2020 | Lin | B60J 5/047 |
| 2020/0208447 | A1 * | 7/2020 | Farkas | E05C 17/54 |
| 2021/0032919 | A1 * | 2/2021 | Peer | E05F 5/006 |
| 2021/0388651 | A1 * | 12/2021 | Oldknow | E05C 17/54 |

FOREIGN PATENT DOCUMENTS

| | | | | | |
|---|---|---|---|---|---|
| CN | 220277356 | U | * | 1/2024 | |
| CN | 222401982 | U | * | 1/2025 | |
| CN | 223417502 | U | * | 10/2025 | |
| DE | 102008009590 | B4 | | 11/2020 | |
| FR | 2893300 | A1 | * | 5/2007 | E05C 21/005 |
| JP | 2007038161 | A | * | 2/2007 | |
| JP | 20159692 | A | | 1/2015 | |

* cited by examiner

MAGNETIC DOOR OVERSLAM AND PAINT PROCESS RETENTION TOOL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a magnetic door overslam and paint process retention tool.

During the process of painting a vehicle, the doors of the vehicle are typically opened to various degrees to facilitate painting of the door and the door frame of the vehicle. The door is typically not closed entirely so as to not disrupt paint applied to the door frame. The paint process typically takes place before the final latch and door check link are installed. The door check link is a device that restricts the degree to which the door may be opened, and allows the door to be retained at one or more predetermined positions along a path of door opening movement permitted by the door hinge.

SUMMARY

The present disclosure provides for, in various features, a door retention device including: a base defining a hook configured to cooperate with a door or a door frame of a vehicle; and a magnet mounted to the base, the magnet configured to cooperate with the door or the door frame to which the door retention device is not in cooperation with by way of the hook. The door retention device is configured to hook onto the door or the door frame of the vehicle to position the door retention device between the door and the door frame, in a partially closed door position the magnet is configured to connect to the door frame or the door to hold the door relative to the door frame and prevent the door from completely closing.

In further features, the door retention device is configured to hook onto a portion of the door defining an opening configured to permit access to a door latch.

In further features, a gap is defined between the base and a tab is configured to receive the portion of the door defining the opening.

In further features, the tab extends beyond a distal end of the base and is configured to sit within the opening when the door retention device is hooked onto to the door.

In further features, a cover is over the magnet.

In further features, the cover is made of a polymeric material.

In further features, the cover is mounted to the base with a fastener.

In further features, the base defines a recess configured to cooperate with the fastener.

In further features, the fastener is a rivet.

In further features, a gap is defined between the base and a tab is configured to receive a portion of the door defining an opening, and the tab includes a raised surface at a distal end thereof.

In further features, the door retention device includes a handle.

In further features, the handle is configured as a flange extending beyond an outer surface of the base.

The present disclosure also provides for, in various features, a door retention device including: a base including an outer surface and an inner surface opposite to the outer surface; a magnet seated on the outer surface of the base; a cover over the magnet, the cover secured to the base with a fastener mounted to the base; a tab opposite to, and spaced apart from, the inner surface of the base to define a gap between the tab and the inner surface of the base, the tab extending outward beyond a distal end of the base; and a handle. The door retention device is configured to clip onto a door of a vehicle to position the door retention device between the door and a door frame of the vehicle, in a partially closed door position the magnet is configured to connect to a door frame of the vehicle to hold the door relative to the door frame and prevent the door from completely closing.

In further features, the cover is removable and made of a polymeric material.

In further features, the base defines a recess configured to cooperate with the fastener configured as a rivet.

In further features, a flange of the handle extends outward beyond the outer surface of the base.

The present disclosure also includes, in various features, a door retention device including: a base including an outer surface, an inner surface opposite to the outer surface, and a recess at a side of the base; a magnet seated on the outer surface of the base; a cover over the magnet, the cover is made of a polymeric material and secured to the base; a fastener in cooperation with the cover and the base at the recess of the base to mount the cover to the base; a flexible tab opposite to, and spaced apart from, the inner surface of the base to define a gap between the flexible tab and the inner surface of the base, the flexible tab including a raised surface at a distal end thereof; and a handle including a flange extending outward from the base beyond the outer surface of the base. The door retention device is configured to clip onto a door of a vehicle to position the door retention device between the door and a door frame of the vehicle. In a partially closed door position, the magnet is configured to connect to a door frame of the vehicle to hold the door relative to the door frame and prevent the door from completely closing.

In further features, the flexible tab extends outward beyond a distal end of the base.

In further features, the fastener is configured as a rivet.

In further features, the polymeric material of the cover includes nylon.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

As a vehicle is painted, the doors are opened and closed at various stages of the paint process. At certain stages, care must be taken to prevent the door from completely closing. Otherwise, paint applied to the door frame that has not yet dried may be disrupted. The present disclosure provides for a door retention device configured to clip onto the door at an opening for a door latch of the door. The door retention device includes a magnet, which is configured to connect to the metallic door frame at an area that is later covered by a weather strip. Cooperation between the magnet of the device and the door frame holds the door closed, allows the door to be opened as necessary during painting, and prevents the door from entirely closing, which may disrupt paint of the door frame. Any disruption of the door frame paint caused by interaction between the magnet and the door frame is ultimately covered by the weather strip. Thus, any paint disruption is not visible at the end of production. The door retention device of the present disclosure eliminates any need for use of a temporary door check link during the painting process. The door retention device is configured to clip onto a vehicle door, and may be configured for use with any non-vehicular application as well.

Figure 1:
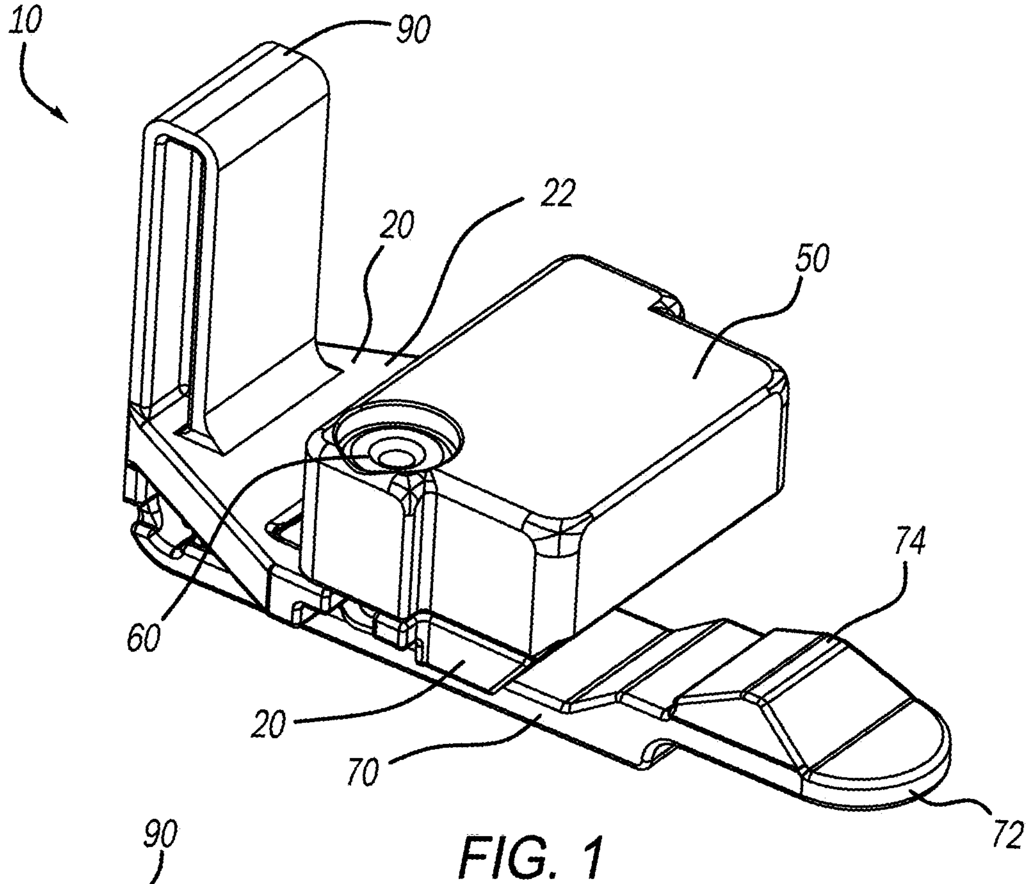
FIG. 1 is a perspective view of a door retention device in accordance with the present disclosure.
Figure 2:
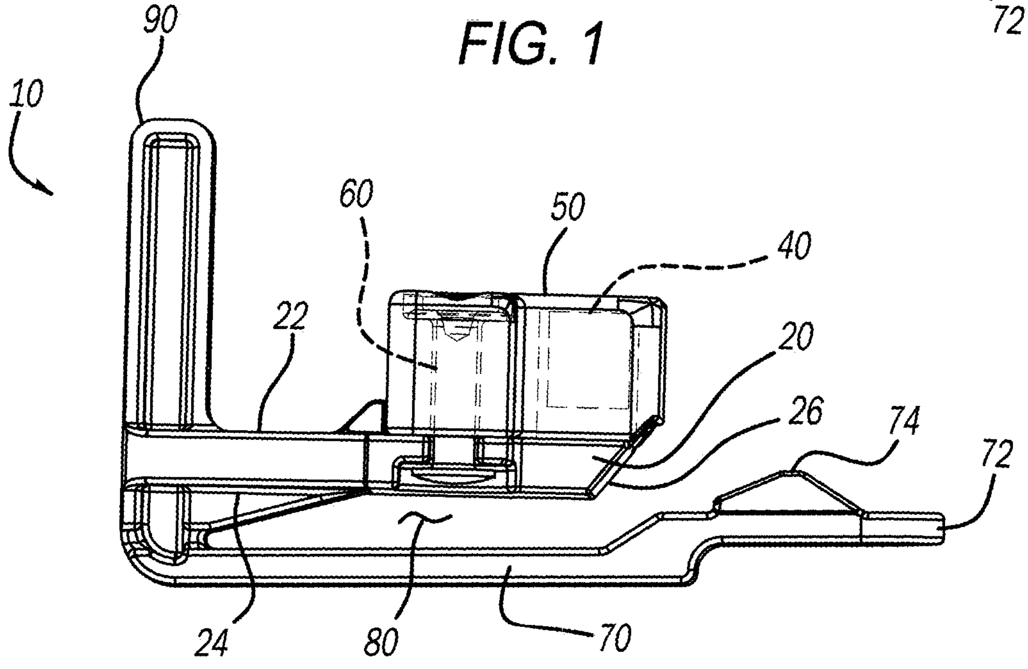
FIG. 2 is a side view of the door retention device of FIG. 1.
Figure 3:
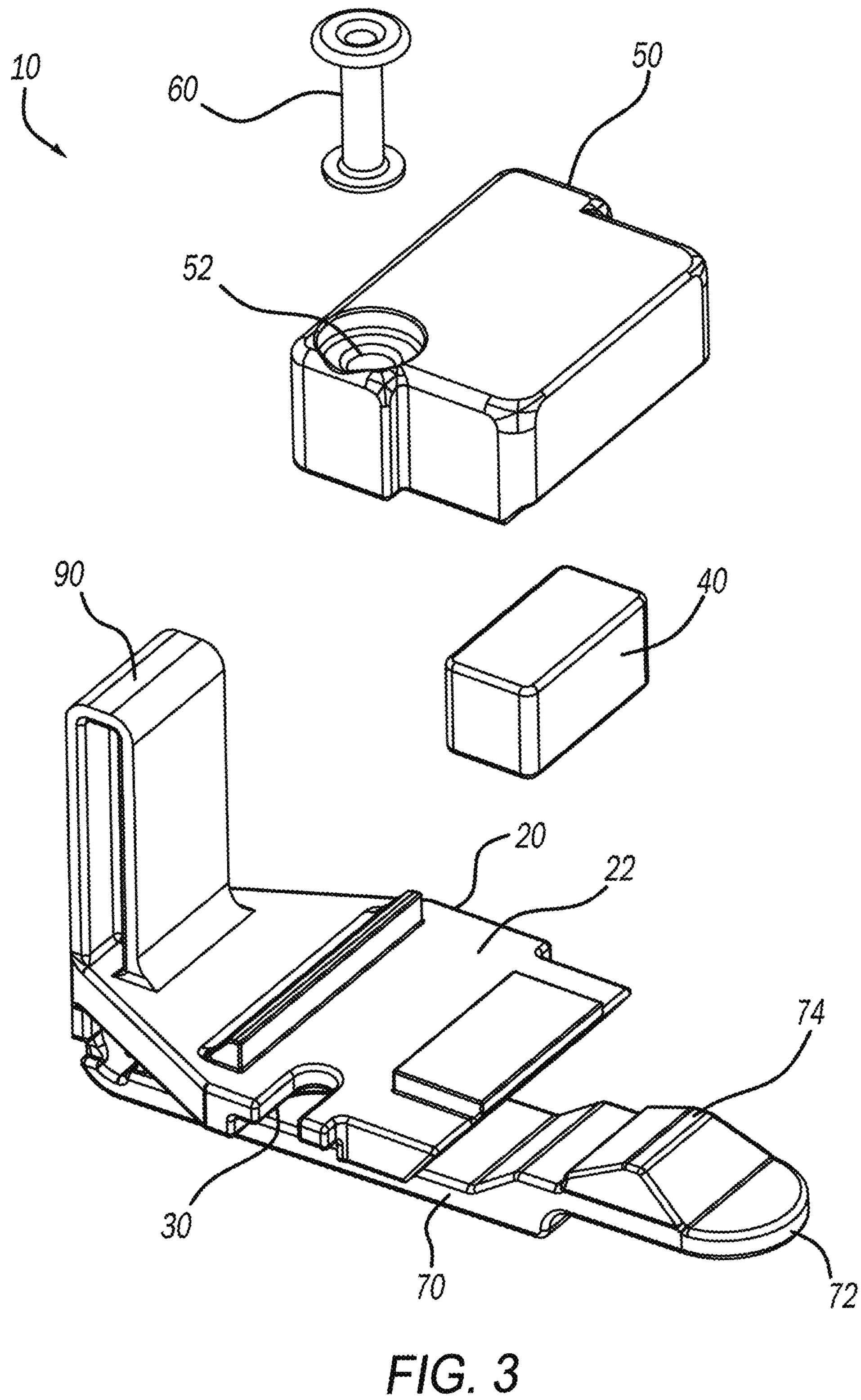
FIG. 3. is an exploded view of the door retention device of FIG. 1.

FIGS. 1-3 illustrate an exemplary door retention device 10 in accordance with the present disclosure. The device 10 generally includes a base 20 with an outer surface 22, an inner surface 24, and a distal end 26. The outer surface 22 is opposite to the inner surface 24.

Mounted to the base 20 is a magnet 40. The magnet 40 may be any suitable magnet configured to cooperate with a vehicle door frame. For example, the magnet 40 may be a N42SH Neodymium magnet. The magnet 40 may have any suitable shape and size. For example, the magnet 40 may be 0.5"×0.5"×1' in size. The magnet 40 is secured to the base 20 in any suitable manner. For example, the magnet 40 may be directly connected to the base 20, or held against the base with a cover 50.

The cover 50 may be made of any suitable material, such as a polymeric material. The cover 50 may be made of Nylon 6/6 heat resistant plastic, for example. The cover 50 is mounted to the base 20 with any suitable fastener 60. The fastener 60 may be, for example, a rivet configured to be seated in an aperture 52 defined by the cover 50 and be seated in cooperation with a U-shaped cutout 30 defined by the base 20. The fastener 60 may be configured to cooperate with the base 20 in any other suitable manner as well.

During painting, the cover 50 may be covered with paint, which may build up over numerous paint processes. As the paint buildup becomes too thick for continued use, the cover 50 may be removed and replaced. For example, the fastener 60 may be slid out from within the cutout 30 to allow the cover 50 to be removed and recycled. A new cover 50 may then be secured over the magnet 40 with the used fastener 60 or a new fastener 60. Whether or not the fastener 60 may be reused will depend on how the fastener 60 is configured. If the fastener 60 is configured as a bolt it can likely be used. If the fastener 60 is configured as a rivet, it will likely not be reusable. Depending on various circumstances, only the magnet 40 may be reused.

The door retention device 10 further includes a tab 70, which may be flexible. The tab 70 is opposite to, and spaced apart from, the inner surface 24 of the base 20. The tab 70 defines a gap 80 between the inner surface 24 of the base 20 and the tab 70. A distal end 72 of the tab 70 extends outward beyond the distal end 26 of the base 20. At or proximate to the distal end 72 of the tab 70 is a raised surface 74, which facilitates interaction between the flexible tab 70 and the door, as explained herein. The gap 80 provides a hook or clip configured to cooperate with the door to connect the device 10 to the door, as explained herein.

The door retention device 10 also includes a handle 90, which in the example illustrated is generally a flange extending outward beyond the outer surface 22 of the base 20. The handle 90 is configured to be grasped by a human or robotic installer for installation in a door of a vehicle, or any other suitable door. The handle 90 may be configured in any other suitable manner to facilitate installation of the device 10 in any suitable door.

Figure 4:
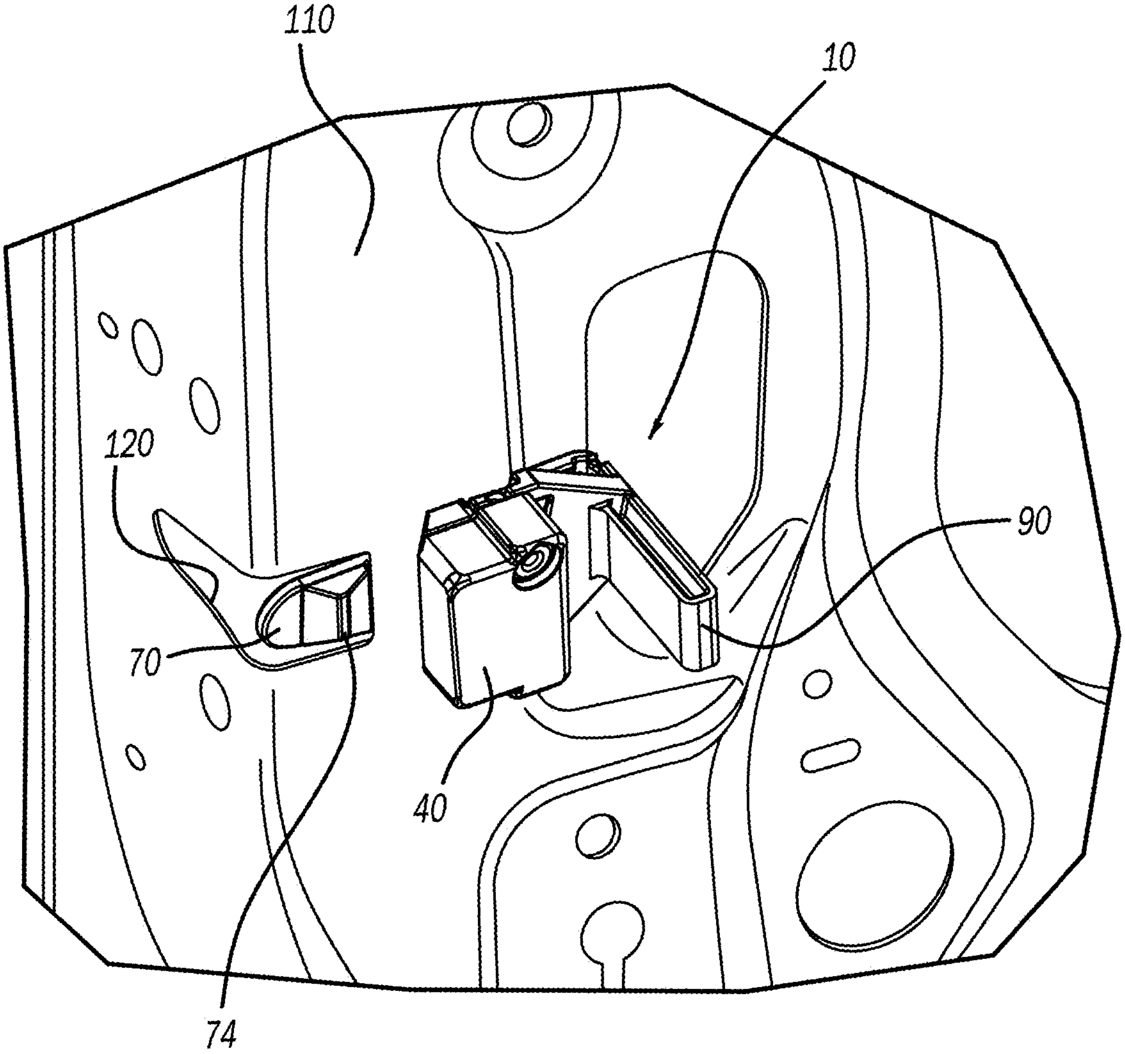
FIG. 4 is a perspective view of the door retention device of FIG. 1 clipped to a door.
Figure 5:
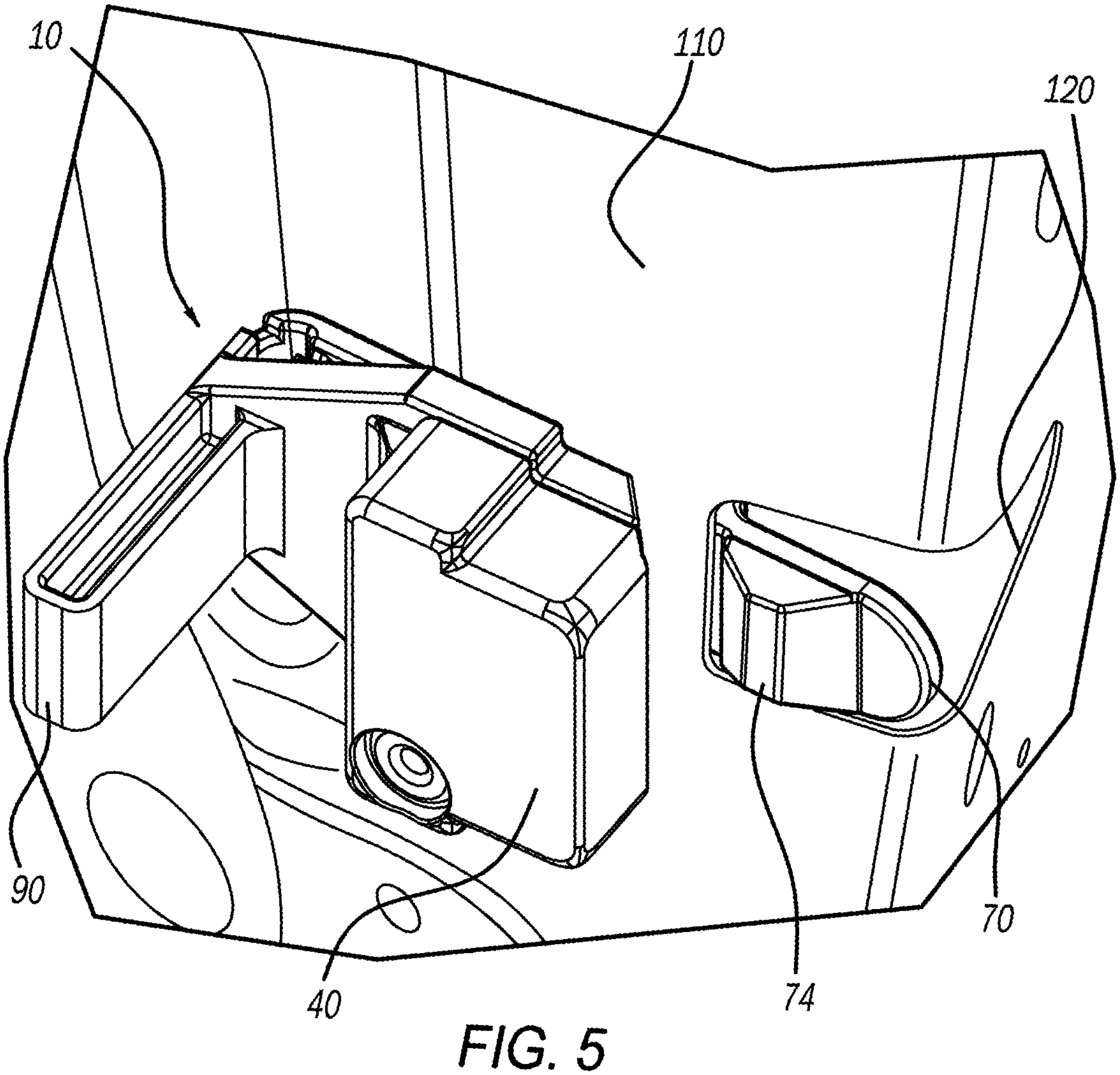
FIG. 5 is another perspective view of the door retention device of FIG. 1 clipped to the door.
Figure 6:
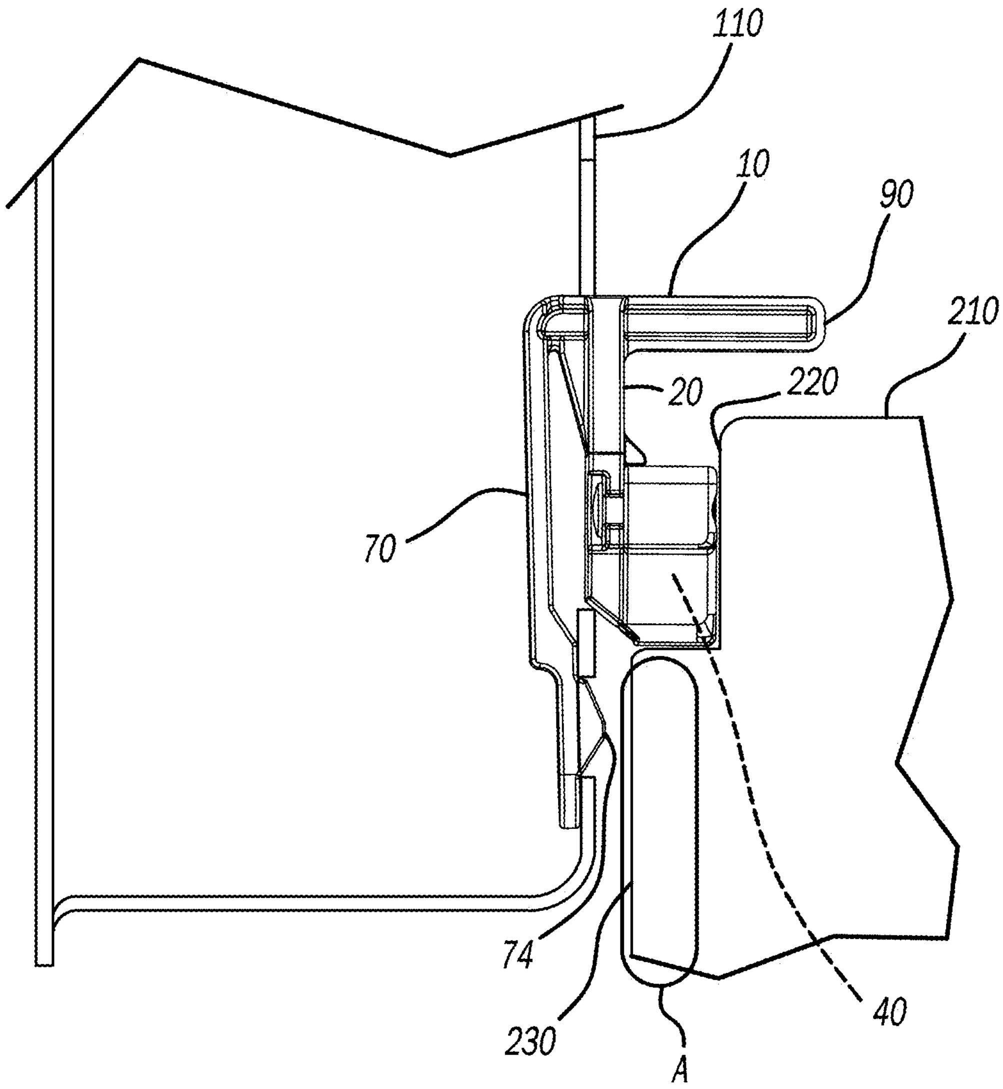
FIG. 6 illustrates interaction between the door retention device and both the door and a door frame.

FIGS. 4, 5, and 6, illustrate an exemplary door 110 and the door retention device 10 clipped onto the door 110. The door 110 defines an opening 120, beyond which a door latch is ultimately installed. The device 10 may be configured to be clipped onto any other suitable portion of the door 110 as well. In the example illustrated, the device 10 is positioned such that the tab 70 is within the opening 120 and the base 20 with the magnet 40 are outside of the opening 120. A portion of the door 110 is thus seated within the gap 80, and on a side of the raised surface 74 opposite to the distal end 72 of the flexible tab 70. The raised surface 74 facilitates retention of the device 10 within the opening 120.

The device 10 is configured to hold the door 110 partially closed at a door frame 210 during the painting process, which typically occurs prior to installation of a door latch and a door check link. The door check link is a device that restricts the degree to which the door may be opened, and allows the door to be retained at one or more predetermined positions along a path of door opening movement permitted by the door hinge. The device 10 holds the door 110 partially closed through interaction between the magnet 40 and an area 220 of the door frame 210 (see FIG. 6) that is ultimately covered by a weather strip after painting. The area 220 is metallic, and may include a flange for the weather strip to be mounted to. The handle 90 will typically extend into the door frame 210 when the door 110 is in the partially closed position.

Cooperation between the magnet 40 of the device 10 and the area 220 of the door frame 210 as illustrated in FIG. 6, holds the door 110 partially closed, allows the door 110 to be opened as necessary during painting, and prevents the door 110 from entirely closing, which may disrupt paint applied to the door frame 210. By preventing the door 110 from entirely closing, the device 10 acts as an overslam limiter to prevent contact with wet paint of the door frame 210, such as wet paint at surface 230. Any disruption of the paint of the door frame 210 caused by interaction between the magnet 40 and the door frame 210 (particularly the area 220 and the surface 230 of the door frame 210) is ultimately covered by the weather strip. Thus, any paint disruption is not visible at the end of production. The door retention device 10 of the present disclosure eliminates any need for use of a temporary door check link during the painting process. The device 10 is also free of mechanical manipulation or mechanism as part of the functionality thereof that may be mispositioned or otherwise not operate as intended.

While FIGS. 4, 5, and 6 illustrate the device 10 as clipped onto the door 110, the orientation may be reversed such that the device 10 is attached to the door frame 210 in any suitable manner. For example, the device 10 may be clipped onto any suitable portion of the door frame 210. With the device 10 clipped onto the door frame 210, cooperation between the magnet 40 of the device 10 and the door 110 will hold the door 110 partially closed, allow the door 110 to be opened as necessary during painting, and prevent the door 110 from entirely closing, which may disrupt paint applied to the door 110 and/or the door frame 210.

Figure 7:
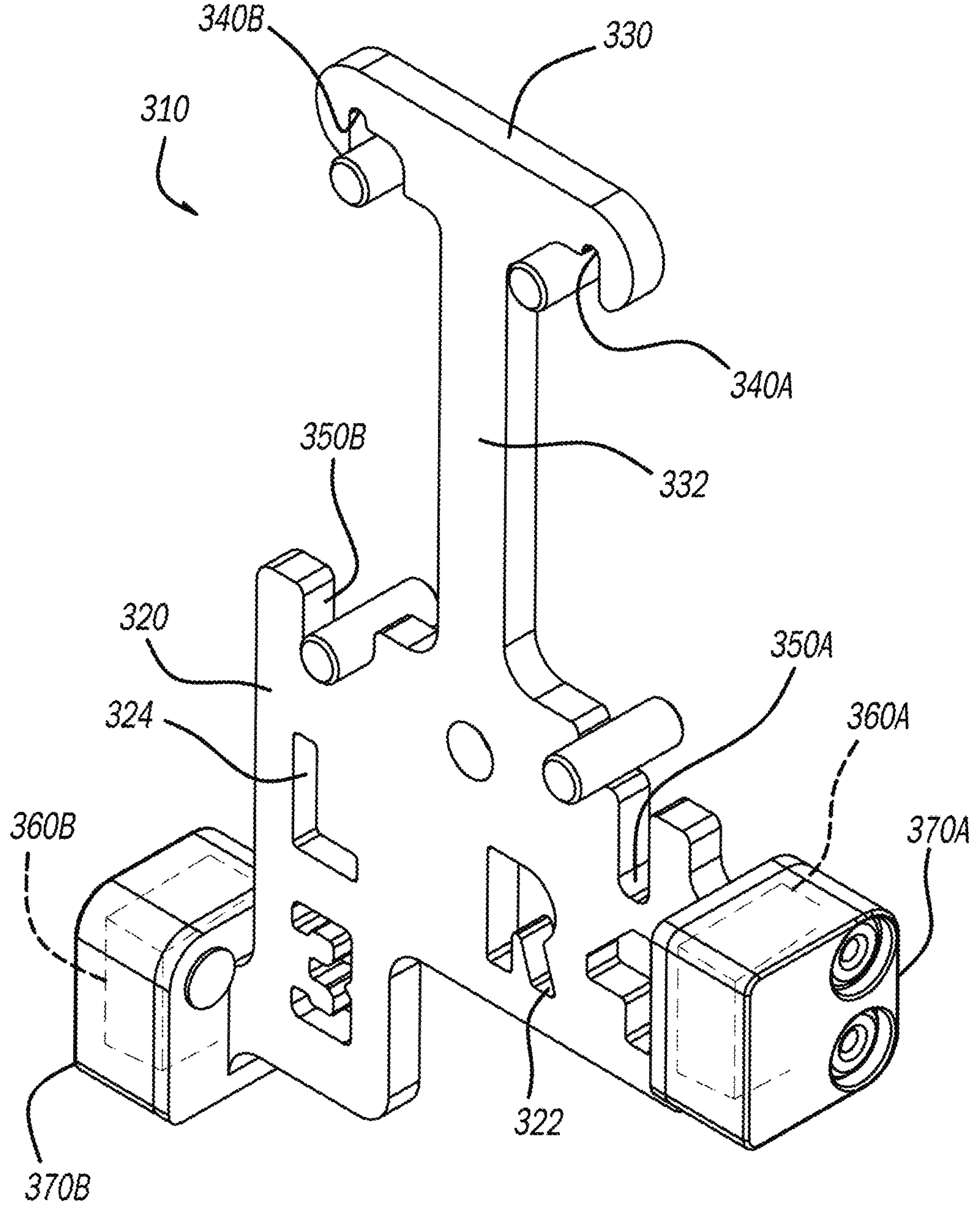
FIG. 7 is a perspective view of another door retention device in accordance with the present disclosure.

FIG. 7 illustrates another exemplary door retention device 310 in accordance with the present disclosure. The door retention device 310 is configured to be attached to the door frame 210. The device 310 includes a main body 320. The device 310 is configured to be attached to either a right side vehicle door frame or a left side vehicle door frame. To facilitate placement of the device 310, the device 310 may include righthand and lefthand indicators, such as an "R" 322 and an "L" 324 printed, engraved, or otherwise included with the main body 320 to facilitate placement of the device 310 on a right side vehicle door frame or a left side vehicle door frame.

Spaced apart from the main body 320 is a hook base 330. The hook base 330 is connected to the main body 320 by an arm 332. The hook base 330 includes a right hook 340A and a left hook 340B. The right hook 340A is configured to hook onto any suitable portion of a right side vehicle door frame, such as a right side aperture. The left hook 340B is configured to hook onto any suitable portion of a left side vehicle door frame, such as a left side aperture. The main body 320 defines a right slot 350A and a left slot 350B. The right slot 350A is configured to cooperate with any suitable portion of a right side of a vehicle door frame, such as to receive a weatherstrip flange on a right side of a vehicle. The left slot 350B is configured to cooperate with any suitable portion of a left side of a vehicle door frame, such as to receive a weatherstrip flange on a left side of a vehicle.

The main body 320 further includes a right magnet 360A beneath a right cover 370A, and a left magnet 360B beneath a left cover 370B. The right magnet 360A is configured to cooperate with a right door when the device 310 is mounted to a right side vehicle door frame of a vehicle. The left magnet 360B is configured to cooperate with a left door when the device 310 is mounted to a left side vehicle door frame of a vehicle. With the device 310 clipped onto the right side vehicle door frame, cooperation between the right magnet 360A and the right door will hold the right door partially closed, allow the right door to be opened as necessary during painting, and prevent the right door from entirely closing, which may disrupt paint applied to the door and/or the door frame. With the device clipped onto the left side vehicle door frame, cooperation between the left magnet 360B and the left door will hold the left door partially closed, allow the left door to be opened as necessary during painting, and prevent the left door from entirely closing, which may disrupt paint applied to the door and/or the door frame.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A door retention device comprising:

a base defining a hook configured to cooperate with a door or a door frame of a vehicle; and a magnet mounted to the base, the magnet configured to cooperate with the door or the door frame to which the door retention device is not in cooperation with by way of the hook, wherein:

the door retention device is configured to hook onto the door or the door frame of the vehicle to position the door retention device between the door and the door frame, in a partially closed door position the magnet is configured to connect to the door frame or the door to hold the door relative to the door frame and prevent the door from completely closing;

the door retention device is configured to hook onto a portion of the door defining an opening configured to permit access to a door latch; and a gap defined between the base and a tab is configured to receive the portion of the door defining the opening.

2. The door retention device of claim 1, wherein the tab extends beyond a distal end of the base and is configured to sit within the opening when the door retention device is hooked onto the door.

3. The door retention device of claim 1, further comprising a cover over the magnet.

4. The door retention device of claim 3, wherein the cover is made of a polymeric material.

5. The door retention device of claim 3, wherein the cover is mounted to the base with a fastener.

6. The door retention device of claim 5, wherein the base defines a recess configured to cooperate with the fastener.

7. The door retention device of claim 5, wherein the fastener is a rivet.

8. The door retention device of claim 1, wherein the tab includes a raised surface at a distal end thereof.

9. The door retention device of claim 1, further comprising a handle.

10. The door retention device of claim 9, wherein the handle is configured as a flange extending beyond an outer surface of the base.

11. A door retention device comprising:

a base including an outer surface and an inner surface opposite to the outer surface;

a magnet seated on the outer surface of the base;

a cover over the magnet, the cover secured to the base with a fastener mounted to the base;

a tab opposite to, and spaced apart from, the inner surface of the base to define a gap between the tab and the inner surface of the base, the tab extending outward beyond a distal end of the base; and a handle, wherein the door retention device is configured to clip onto a door of a vehicle to position the door retention device between the door and a door frame of the vehicle, in a partially closed door position the magnet is configured to connect to the door frame of the vehicle to hold the door relative to the door frame and prevent the door from completely closing.

12. The door retention device of claim 11, wherein the cover is removable and made of a polymeric material.

13. The door retention device of claim 11, wherein the base defines a recess configured to cooperate with the fastener configured as a rivet.

14. The door retention device of claim 11, wherein a flange of the handle extends outward beyond the outer surface of the base.

15. A door retention device comprising:

a base including an outer surface, an inner surface opposite to the outer surface, and a recess at a side of the base;

a magnet seated on the outer surface of the base;

a cover over the magnet, the cover is made of a polymeric material and secured to the base;

a fastener in cooperation with the cover and the base at the recess of the base to mount the cover to the base;

a flexible tab opposite to, and spaced apart from, the inner surface of the base to define a gap between the flexible tab and the inner surface of the base, the flexible tab including a raised surface at a distal end thereof; and a handle including a flange extending outward from the base beyond the outer surface of the base, wherein the door retention device is configured to clip onto a door of a vehicle to position the door retention device between the door and a door frame of the vehicle, in a partially closed door position the magnet is configured to connect to the door frame of the vehicle to hold the door relative to the door frame and prevent the door from completely closing.

16. The door retention device of claim 15, wherein the flexible tab extends outward beyond a distal end of the base.

17. The door retention device of claim 15, wherein the fastener is configured as a rivet.

18. The door retention device of claim 15, wherein the polymeric material of the cover includes nylon.

* * * * *